US011318795B2

(12) United States Patent
Taniguchi

(10) Patent No.: US 11,318,795 B2
(45) Date of Patent: May 3, 2022

(54) PNEUMATIC TIRE

(71) Applicant: TOYO TIRE CORPORATION, Itami (JP)

(72) Inventor: Jiro Taniguchi, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 281 days.

(21) Appl. No.: 16/750,219

(22) Filed: Jan. 23, 2020

(65) Prior Publication Data

US 2020/0262246 A1 Aug. 20, 2020

(30) Foreign Application Priority Data

Feb. 20, 2019 (JP) .............................. JP2019-028594

(51) Int. Cl.
*B60C 11/12* (2006.01)
*B60C 11/03* (2006.01)

(52) U.S. Cl.
CPC ........ *B60C 11/1263* (2013.01); *B60C 11/032* (2013.01); *B60C 11/0306* (2013.01); *B60C 11/1204* (2013.01); *B60C 11/1236* (2013.01); B60C 2011/0351 (2013.01); B60C 2011/1213 (2013.01)

(58) Field of Classification Search
CPC ..... B60C 11/13; B60C 11/12; B60C 11/0306; B60C 11/0309; B60C 11/0316; B60C 11/1384; B60C 11/1376; B60C 11/1204
See application file for complete search history.

(56) References Cited

U.S. PATENT DOCUMENTS

2005/0121124 A1* 6/2005 Tsubono ................. B60C 11/12
152/209.25
2015/0246584 A1* 9/2015 Marui ..................... B60C 11/11
152/209.15
2017/0361660 A1 12/2017 Furusawa
2018/0333990 A1 11/2018 Furusawa
2019/0084351 A1* 3/2019 Furusawa ............. B60C 11/032

FOREIGN PATENT DOCUMENTS

JP H07-001919 A 1/1995
JP 2016-107726 A 6/2016
JP 2016-107727 A 6/2016
JP 2016-107728 A 6/2016

OTHER PUBLICATIONS

Office Action dated Nov. 3, 2021, issued in counterpart CN Application No. 201911320426.4, with an abridged translation. (10 pages).

* cited by examiner

*Primary Examiner* — Cedrick S Williams
(74) *Attorney, Agent, or Firm* — WHDA, LLP

(57) ABSTRACT

In a pneumatic tire which is formed with plural shallow grooves 40 and plural recesses 32 in a tread and in which the plural shallow grooves 40 extend in parallel, the plural shallow grooves 40 form a saw teeth shape as a cross-sectional shape of the tread in a direction orthogonal to an extending direction of the shallow grooves 40, portions corresponding to apexes of the saw teeth shape are formed as edges 44, and the recess 32 is formed between the two edges 44.

3 Claims, 13 Drawing Sheets

PNEUMATIC TIRE

CROSS-REFERENCE TO RELATED APPLICATION

The present application benefits by the priority right claimed in Japanese Patent Application No. 2019-28594 filed on Feb. 20, 2019 on the basis of Japanese Patent Application No. 2019-28594. Japanese Patent Application No. 2019-28594 is incorporated herein by reference in its entirety.

TECHNICAL FIELD

The present invention relates to a pneumatic tire.

BACKGROUND ART

As described in Patent Documents 1 to 3, pneumatic tires, in each of which plural shallow grooves are formed in a tread and plural circular recesses are further formed when viewed in a tire radial direction, have been known. A water film between a frozen road surface and the tread is eliminated by the shallow groove and the recess in such a pneumatic tire, which improves on-ice braking performance of the pneumatic tire.
Patent Document 1: JP-A-2016-107726
Patent Document 2: JP-A-2016-107727
Patent Document 3: JP-A-2016-107728

SUMMARY OF THE INVENTION

By the way, it has been desired to further improve travel performance on the frozen road surface. However, it is not desired to change such a feature that the shallow grooves and the recesses as described above are formed in the tread.

In view of the above, the present invention has a purpose of providing a pneumatic tire whose travel performance on a frozen road surface is further improved while a structure of a tread formed with shallow grooves and recesses is maintained.

In a pneumatic tire according to an embodiment which is formed with plural shallow grooves and plural recesses in a tread and in which the plural shallow grooves extend in parallel, the plural shallow grooves form a saw teeth shape as a cross-sectional shape of the tread in a direction orthogonal to an extending direction of the shallow grooves, portions corresponding to apexes of the saw teeth shape are formed as edges, and the recess is formed between the two edges.

In the above pneumatic tire, an edge effect is exerted by the edges of the shallow grooves and the recesses, each of which is formed between the two edges. Thus, travel performance on a frozen road surface is further improved.

EMBODIMENTS FOR CARRYING OUT THE INVENTION

Figure 1:
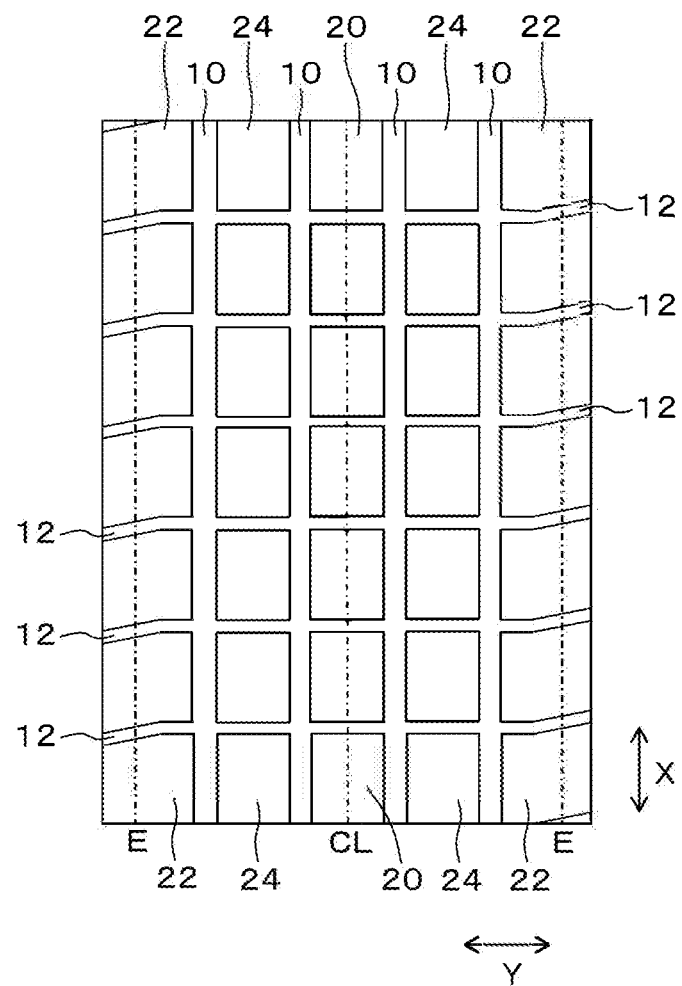
FIG. 1 illustrates a tread pattern of a pneumatic tire according to an embodiment. In this drawing, recesses, shallow grooves, and sipes are not illustrated.

A description will be made on a pneumatic tire according to an embodiment on the basis of the drawings. Note that features of the pneumatic tire, which will be described below, are features in an unloaded state of the pneumatic tire that is attached to a legitimate rim and is filled with air to have a legitimate inner pressure unless otherwise noted. Here, the legitimate rim is specified as the "Standard Rim" in JATMA standards, the "Design Rim" in TRA standards, or the "Measuring Rim" in ETRTO standards. In addition, the legitimate inner pressure is specified as the "Maximum inflation pressure" in the JATMA standards, a maximum value set in the "TIRE LOAD LIMITS AT VARIOUS COLD INFLATION PRESSURES" in the TRA standards, or the "INFLATION PRESSURE" in the ETRTO standards. In the case where the pneumatic tire is used for a passenger vehicle, the legitimate inner pressure is 180 kPa.

The legitimate load, which will be described below, is specified as the "Maximum load capacity" in the JATMA standards, a maximum value set in the "TIRE LOAD LIMITS AT VARIOUS COLD INFLATION PRESSURES" in the TRA standards, or the "LOAD CAPACITY" in the ETRTO standards. In the case where the pneumatic tire is used for the passenger vehicle, the legitimate load is 85% of a corresponding load at the inner pressure of 180 kPa.

The pneumatic tire in the embodiment has a similar structure to a general radial tire except for a structure of a tread. The structure of the pneumatic tire in the embodiment will briefly be exemplified below.

First, a bead is provided on each side in a tire width direction. The bead includes: a bead core that is made of steel wire wound in a circular shape; and a bead filler that is made of rubber and provided on a radially outer side of the bead core. A carcass ply stretches between the beads on both of the sides in the tire width direction. The carcass ply is a sheet-shaped member in which a large number of ply cords arranged in a direction orthogonal to a tire circumferential direction is coated with the rubber. The carcass ply defines a framework shape of the pneumatic tire between the beads on both of the sides in the tire width direction and is folded from an inner side to an outer side in the tire width direction around each of the beads to wrap each of the beads. A sheet-shaped inner liner that is made of the rubber with low air permeability adheres to an inner side of the carcass ply.

One or plural belts are provided on an outer side of the carcass ply in a tire radial direction, and a belt reinforcement layer is provided on an outer side of the belt in the tire radial direction. The belt is a member that is formed by coating a large number of steel cords with the rubber. The belt reinforcement layer is a member that is formed by coating a large number of organic fiber cords with the rubber. The tread having a ground contact surface is provided on an outer side of the belt reinforcement layer in the tire radial direction. A sidewall is provided on each side of the carcass ply in the tire width direction. In addition to these members, members such as a belt under pad and chafers are provided according to the need for tire functions.

Next, the tread will be described. The tread is formed with a tread pattern that includes plural land sections and plural grooves. Although a detail of the tread pattern is not limited, a tread pattern as illustrated in FIG. 1 is exemplified. The tread pattern in FIG. 1 is provided with: four main grooves 10, each of which extends in the tire circumferential direction (a direction indicated by an arrow X in the drawing); and a large number of lateral grooves 12, each of which extends in the tire width direction (a direction indicated by an arrow Y in the drawing). In addition, the large number of the land sections that are divided by the main grooves 10 and the lateral grooves 12 is formed.

As the land sections in the embodiment illustrated in FIG. 1, plural center blocks 20, each of which is sandwiched between the two main grooves 10 near a tire centerline CL, plural shoulder blocks 22, each of which is sandwiched between a tire contact end E and the main groove 10 near the tire contact end E on each of the sides in the tire width direction Y, and plural mediate blocks 24 between the center blocks 20 and the shoulder blocks 22 are formed. The blocks are arranged in the tire circumferential direction X and form block rows.

Note that each of the main grooves does not have to extend linearly in the tire circumferential direction X like the main groove 10 in FIG. 1 but may be bent and extend zigzag in the tire circumferential direction X, may be curved and extend in a wavelike shape in the tire circumferential direction X, or may extend obliquely with respect to the tire circumferential direction X, for example. In addition, the land sections may be ribs that are divided by the main grooves extending in the tire circumferential direction X but not divided by the lateral grooves and extend in the tire circumferential direction X.

Figure 3:
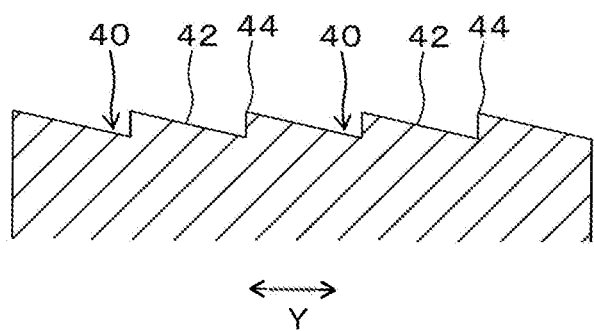
FIG. 3 is a cross-sectional view taken along A-A in FIG. 2 and is a cross-sectional view of the center block in a tire width direction at a position where the recess does not exist.
Figure 4:
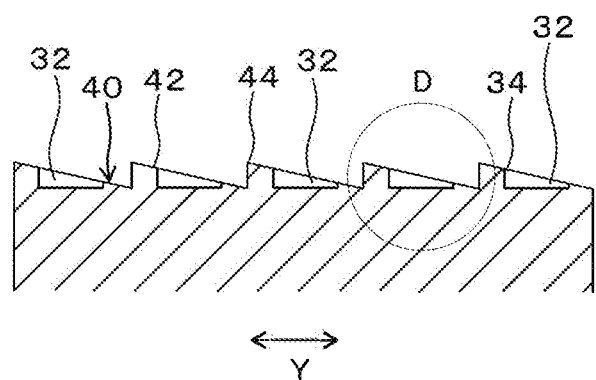
FIG. 4 is a cross-sectional view taken along B-B in FIG. 2 and is a cross-sectional view of the center block in the tire width direction at a position of the recess.

Next, a structure of each of the land sections will be described by using the center block 20 as an example. As illustrated in FIG. 2 to FIG. 5, the center block 20 is provided with plural shallow grooves 40, each of which extends linearly. Each of these shallow grooves 40 is referred to as a first edge or the like. These shallow grooves 40 extend in the same direction and are parallel with each other. In this embodiment, it is assumed that these shallow grooves 40 extend in the tire circumferential direction X. As illustrated in FIG. 3, each of the shallow grooves 40 is a groove that forms an inclined surface 42 that is inclined with respect to the ground contact surface of a case where the shallow grooves 40 are not provided. The plural shallow grooves 40 are arranged in a direction (that is, the tire width direction Y) orthogonal to an extending direction of the shallow grooves 40 (that is, the tire circumferential direction X). Thus, as illustrated in FIG. 3 and FIG. 4, the plural inclined surfaces 42 are continuously formed in the tire width direction Y. As a result, as illustrated in FIG. 3 and FIG. 4, these shallow grooves 40 form a saw teeth shape as a cross-sectional shape of the center block 20 in the tire width direction Y. Apexes of this saw teeth shape serve as edges 44, each of which extends in the tire circumferential direction X.

A depth (that is, a height in the tire radial direction from a bottom of the shallow groove 40 to the edge 44) H1 of the shallow groove 40 (see FIG. 6) is equal to or greater than 0.1 mm and equal to or less than 0.4 mm, for example. An interval of the shallow grooves 40 (same as a distance V1 (see FIG. 6) between the two edges 44, which will be described later) is equal to or greater than 2.0 mm and equal to or less than 4.0 mm, for example.

Figure 2:
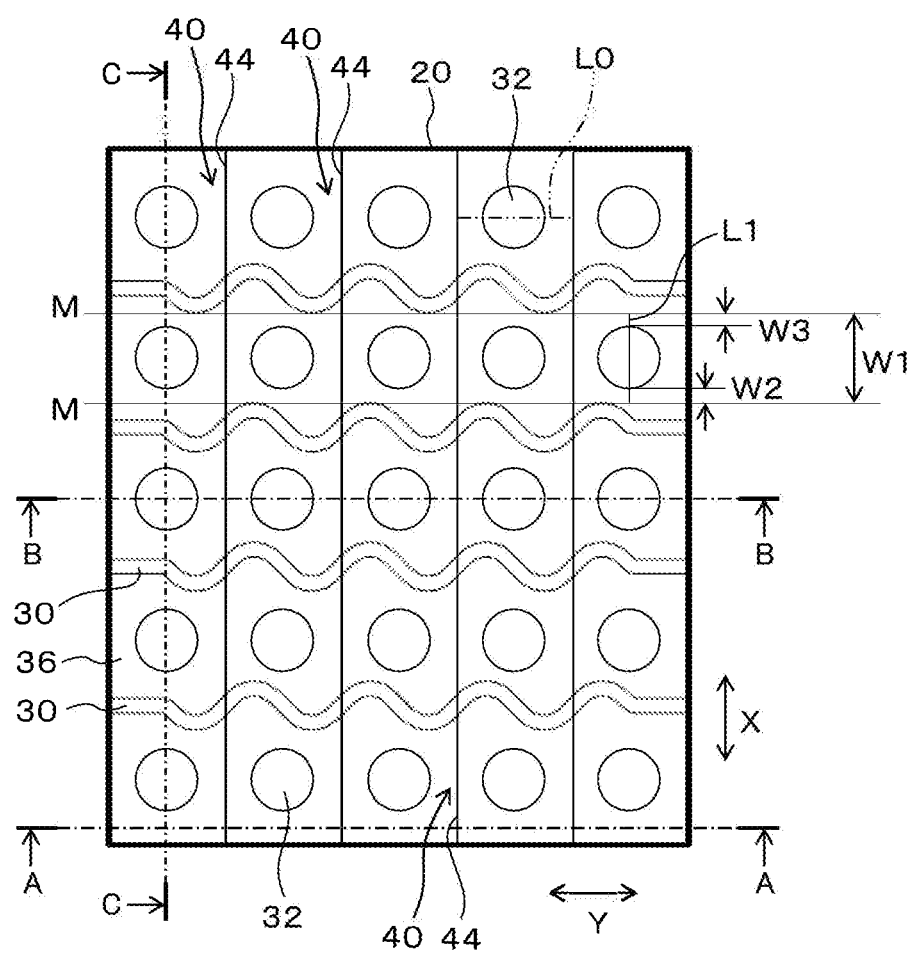
FIG. 2 is a view of one of center blocks in the embodiment that is viewed from an outer side in a tire radial direction.

In addition, as illustrated in FIG. 2, the center block 20 is provided with sipes 30, each of which extends in the tire width direction Y. Each of the sipes 30 is a narrow groove, and more specifically, is a groove whose opening opened to the ground contact surface is closed when the pneumatic tire, which is attached to the legitimate rim and is filled with the air to have the legitimate inner pressure, contacts the ground and the legitimate load is exerted thereon. Each of the sipes 30 illustrated in FIG. 2 extends in the tire width direction Y. However, an extending direction of the sipe is not limited thereto, but may be an oblique direction to the tire circumferential direction X and the tire width direction Y, for example. A depth of each of the sipes 30 is not limited. However, in general, each of the sipes 30 is shallower than the main groove 10. The plural (four in the case illustrated in FIG. 2) sipes 30 are provided in the single center block 20.

Figure 7A:
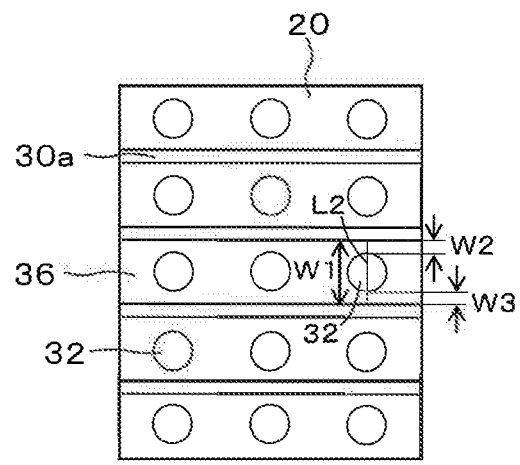
FIG. 7A is a view of the linear sipes that extend in a tire width direction Y and are viewed from the outer side in the tire radial direction, in which the shallow groove is not illustrated.
Figure 7B:
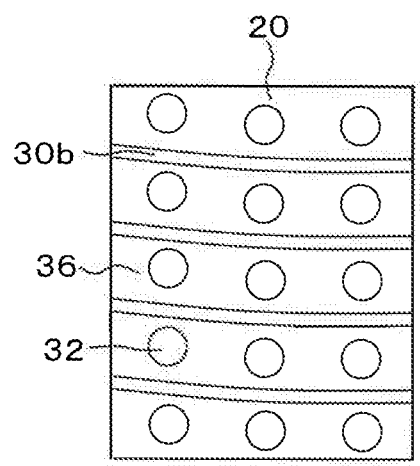
FIG. 7B is a view of the single curved sipe that is seen from the outer side in the tire radial direction, in which the shallow groove is not illustrated.
Figure 7C:
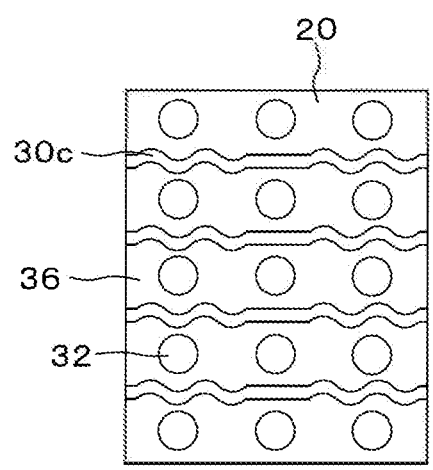
FIG. 7C is a view of the sipe that includes a wavelike portion and a linear portion and is seen from the outer side in the tire radial direction, in which the shallow groove is not illustrated.

Each of the sipes 30 illustrated in FIG. 2 has a wavelike shape when viewed from the outer side in the tire radial direction. However, the shape of each of the sipes is not limited thereto. Instead of the wavelike sipes 30, for example, linear sipes 30a illustrated in FIG. 7A, single-curved sipes 30b illustrated in FIG. 7B, or sipes 30c, each of which includes wavelike portions and a linear portion and is illustrated in FIG. 7C, may be provided.

Figure 7D:
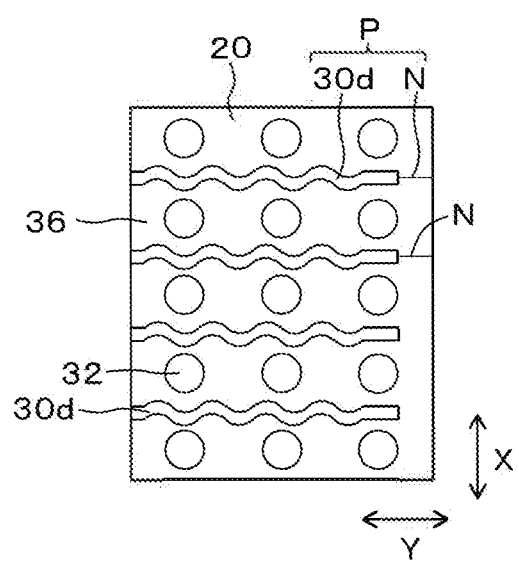
FIG. 7D is a view of the sipe, one end of which is closed in the center block, and which is seen from the outer side in the tire radial direction, in which the shallow groove is not illustrated.

In addition, both ends of each of the sipes 30 in FIG. 2 reach both ends of the center block 20 in a width direction and are opened to the main grooves 10. However, like sipes 30d illustrated in FIG. 7D, at least one of the ends may be closed in the center block 20 and may not be opened to the main groove 10.

Figure 8:
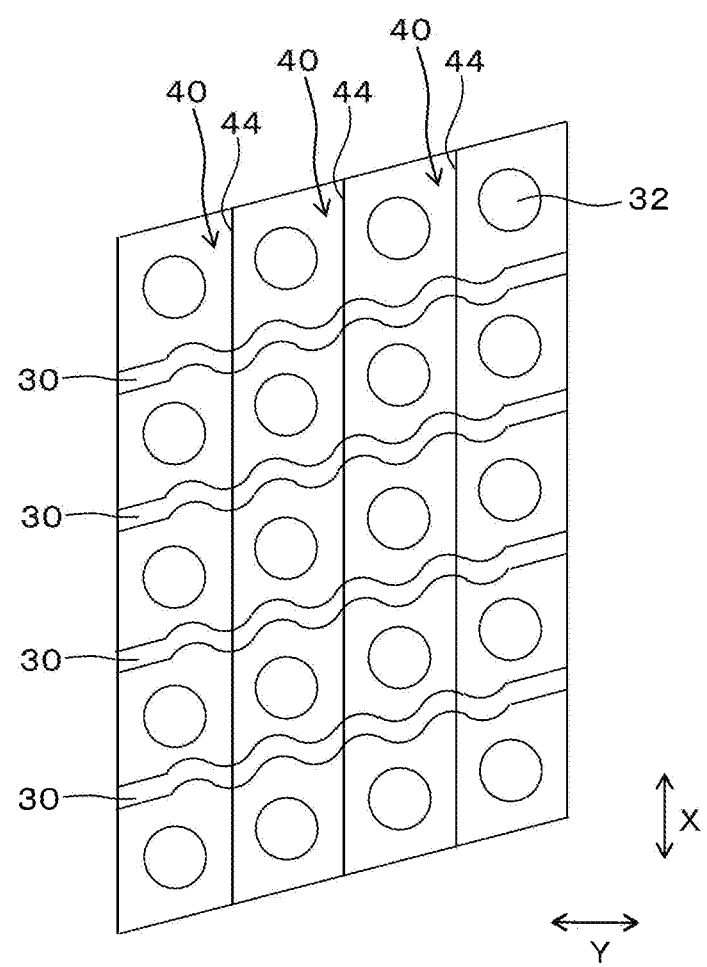
FIG. 8 is a view of a modification example of an angle at which the shallow groove and the sipe intersect each other. It is a view of the center block that is viewed from the outer side in the tire radial direction.

In FIG. 2, the shallow groove 40 and the sipe 30 intersect with each other at a right angle. However, the shallow groove 40 and the sipe 30 may intersect with each other at an angle other than the right angle. For example, in FIG. 8, while each of the shallow grooves 40 extends in the tire circumferential direction X, each of the sipes 30 extends in an oblique direction to the tire width direction Y. Thus, the shallow groove 40 and the sipe 30 intersect with each other at the angle other than the right angle.

Furthermore, as illustrated in FIG. 2 and the like, the center block 20 is provided with plural recesses 32. Each of the recesses 32 in this embodiment has a circular shape when viewed in the tire radial direction (that is, an opening end 34 opened to the ground contact surface has a circular shape).

A diameter of each of the recesses 32 in this case is equal to or greater than 1.6 mm and equal to or less than 3.5 mm, for example. However, in each of the recesses, the shape of the opening end opened to the ground contact surface is not limited thereto and may be a polygonal shape such as a rectangular shape, a pentagonal shape, or a hexagonal shape, for example. Each of the recesses 32 preferably extends in the tire radial direction while maintaining the shape of the opening end 34 (see FIG. 4 and FIG. 6). However, the opening end 34 of each of the recesses 32 may be larger than a portion below the opening end 34 (the inside of each of the recesses 32).

A depth H2 (see FIG. 6) of each of the recesses 32 is equal to or greater than 0.05 mm and equal to or less than 0.5 mm, for example. Here, the depth H2 of the recess 32 is a depth at the deepest position of the recess 32. The depth H1 of the shallow groove 40 is preferably greater than the depth H2 of the recess 32.

Figure 6:
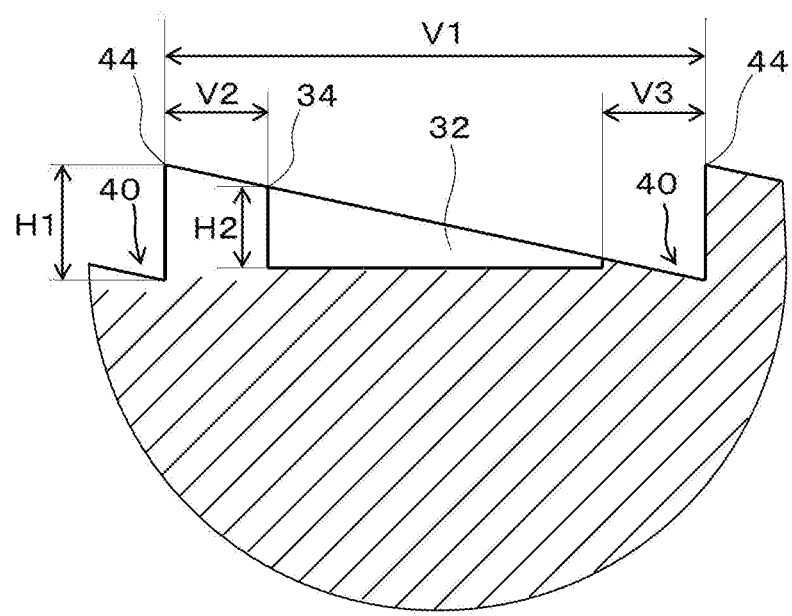
FIG. 6 is an enlarged view of a section D in FIG. 4.

As illustrated in FIG. 2, FIG. 4, and FIG. 6, each of the recesses 32 is formed between the two edges 44 that are formed by the two shallow grooves 40. That is, each of the recesses 32 is formed in the inclined surface 42. The edge 44 and the recess 32 do not overlap or contact each other but separate from each other. As illustrated in FIG. 6, in the case where a distance between the edges 44 on both sides of the recess 32 is set as V1, a distance between the recess 32 and one of the edges 44 is set as V2, and a distance between the recess 32 and the other edge 44 is set as V3, V2/V1 and V3/V1 are each equal to or greater than 0.1 and equal to or less than 0.3.

Here, as illustrated by a two-dot chain line in FIG. 2, the distance V1 between the edges 44 on both of the sides of the recess 32 is a length of a linear line L0 that passes a center of the recess 32 and connects the edges 44 on both of the sides of the recess 32 with the shortest distance. Meanwhile, the distances V2, V3 between the recess 32 and the edges 44 are distances between the recess 32 and the edges 44 on the above linear line L0.

Size of the opening end 34 of the recess 32 and an arrangement position of the recess 32 between the two edges 44 are set such that V2/V1 and V3/V1 are equal to or greater than 0.1 and equal to or less than 0.3 as described above.

Figure 5:
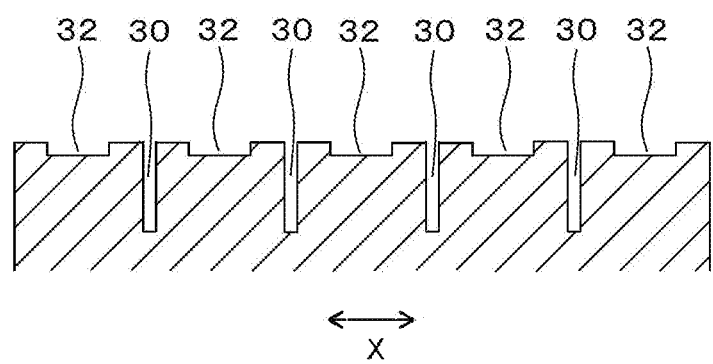
FIG. 5 is a cross-sectional view taken along C-C in FIG. 2 and is a cross-sectional view of the center block in a tire circumferential direction at the position of the recess.

As illustrated in FIG. 2 and FIG. 5, each of the recesses 32 is formed between the two adjacent sipes 30. The sipe 30 and the recess 32 do not overlap or contact each other but separate from each other. Note that, as illustrated in FIG. 2 and FIG. 5, the recesses 32 may also be provided between each end of the center block 20 in the tire circumferential direction X and the sipe 30.

In this embodiment, in the case where a distance between the sipes on both sides of the recess 32 is set as W1, a distance between the recess 32 and one of the sipes is set as W2, and a distance between the recess 32 and the other sipe is set as W3, W2/W1 and W3/W1 are each equal to or greater than 0.1 and equal to or less than 0.3.

Here, as illustrated in FIG. 2, in the case where each of the sipes has the wavelike shape, the distance W1 between the sipes on both of the sides of the recess 32 is a length of a linear line L1 that passes the center of the recess 32 and connects two virtual linear lines M on both sides of the recess 32 with the shortest distance. Here, the virtual linear line M connects apexes on the recesses 32 side of the wavelike sipe. In addition, as illustrated in FIG. 7A, in the case where each of the sipes has the linear shape or the single-curved shape, the distance W1 between the sipes on both of the sides of the recess 32 is a length of a linear line L2 that passes the center of the recess 32 and connects the sipes on both of the sides of the recess 32 with the shortest distance.

As illustrated in FIG. 2, in the case where each of the sipes has the wavelike shape, the distance W2 between the recess 32 and the one of the sipes is a distance on the above linear line L1 between the recess 32 and the virtual linear line M on one of the sipes. In addition, as illustrated in FIG. 7A, in the case where each of the sipes has the linear shape or the single-curved shape, the distance W2 between the recess 32 and the one of the sipes is a distance on the above linear line L2 between the recess 32 and the one of the sipes.

As illustrated in FIG. 2, in the case where each of the sipes has the wavelike shape, the distance W3 between the recess 32 and the other sipe is a distance on the above linear line L1 between the recess 32 and the virtual linear line M on the other sipe. In addition, as illustrated in FIG. 7A, in the case where each of the sipes has the linear shape or the single-curved shape, the distance W3 between the recess 32 and the other sipe is a distance on the above linear line L2 between the recess 32 and the other sipe.

Size of the opening end 34 of the recess 32 and the arrangement position of the recess 32 between the two sipes 30 are set such that W2/W1 and W3/W1 are equal to or greater than 0.1 and equal to or less than 0.3 as described above.

In this embodiment, a portion held between two adjacent sipes 30 is set as a land section piece 36. In the case where at least one of the ends of the sipe is closed in the center block 20 like the sipe 30d illustrated in FIG. 7D, an extension line N that extends from the closed position to an end of the center block 20 in the same direction as an extending direction of the sipe 30d is defined, and a virtual line P that includes the sipe 30d and the extension line N is defined. Then, a portion held between the two adjacent virtual lines P is set as the land section piece 36.

The number of the recesses 32 provided in the single land section piece 36 is not particularly limited. However, it is desired that a ratio of a total opening area of all of the recesses 32 provided in the single land section piece 36 to a ground contact area of the single land section piece 36 is equal to or greater than 10% and equal to or less than 40%. Note that the opening area of the recess(es) 32 is not included in the ground contact area of the land section piece 36. The ground contact area is a ground contact area at the time when the pneumatic tire, which is attached to the legitimate rim and is filled with the air to have the legitimate inner pressure, contacts a flat ground surface and the legitimate load is exerted thereon.

The description has been made so far by using the center block 20 as the example. However, a block that has above-described features related to the shallow grooves 40, the recesses 32, and the like is not limited to the center block 20. At least one of the center block 20, the shoulder block 22, and the mediate block 24 only needs to have the above-described features related to the shallow grooves 40, the recesses 32, and the like.

In other words, only one of the center block 20, the shoulder block 22, and the mediate block 24 may have the above-described features related to the shallow grooves 40, the recesses 32, and the like, or all of the center block 20, the shoulder block 22, and the mediate block 24 may have the above-described features related to the shallow grooves 40, the recesses 32, and the like.

Alternatively, two of the center block 20, the shoulder block 22, and the mediate block 24 may have the above-described features related to the shallow grooves 40, the recesses 32, and the like. That is, any of the following cases can be considered: a case where only the center block 20 and the shoulder block 22 have the above-described features, a case where only the center block 20 and the mediate block 24 have the above-described features, and a case where only the shoulder block 22 and the mediate block 24 have the above-described features.

The pneumatic tire according to this embodiment can be manufactured by a similar method to that of the general radial tire. However, projections, which are used to shape the above recesses 32 during vulcanization, have to be provided on an inner surface of a vulcanizing mold. Each of these projections may be a portion of a spring vent that is located on the inside of the mold, is used to release the air in the mold to the outside, and is projected to the inside of the mold.

Each of the shallow grooves 40 may be formed by scraping a surface of the pneumatic tire after vulcanization molding, or may be formed when vulcanization molding is performed using a mold that is provided with plural projected strips used to form the shallow grooves 40.

Next, a description will be made on effects of this embodiment. In the pneumatic tire according to this embodiment, the plural shallow grooves 40 are arranged in parallel with each other. Accordingly, the cross-sectional shape of the tread in the direction orthogonal to the extending direction of the shallow grooves 40 is the saw teeth shape, and portions corresponding to the apexes of the saw teeth shape are formed as the edges 44. Due to an edge effect of these edges 44, the pneumatic tire in this embodiment has superior travel performance on a frozen road surface.

Furthermore, in the pneumatic tire according to this embodiment, the recesses 32 are formed in the tread. Thus, the edge effect by the recesses 32 is also exhibited. Here, each of the recesses 32 is formed between the two edges 44 and does not overlap or contact the edge 44. Thus, each of the recesses 32 exhibits the additional edge effect without diminishing the edge effect exhibited by the edges 44 of the shallow grooves 40. From what have been described so far, the travel performance of the pneumatic tire according to this embodiment on the frozen road surface is superior to that of the conventional pneumatic tire.

Here, as described above, when V2/V1 and V3/V1 are equal to or greater than 0.1 and equal to or less than 0.3, the edge effects by the shallow grooves 40 and the recesses 32 are improved, which further improves the travel performance on the frozen road surface. More specifically, since V2/V1 and V3/V1 are equal to or greater than 0.1, a rubber portion between the shallow groove 40 and the recess 32 has sufficient thickness, and such a portion can exert a large elastic force. Thus, the edge effect is improved, and the travel performance on the frozen road surface is further improved. In addition, since V2/V1 and V3/V1 are equal to or less than 0.3, the rubber portion between the shallow groove 40 and the recess 32 is not excessively thickened and is deformable, and such a portion can exert the large elastic force. Thus, the edge effect is improved, and the travel performance on the frozen road surface is further improved.

Moreover, since the edge 44 of each of the shallow grooves 40 is long, the significant edge effect is exhibited. As a result, due to the sufficient depth of each of the shallow grooves 40 (more specifically, deeper than the recesses 32), the travel performance of the pneumatic tire on the frozen road surface is further improved.

In the case where the sipes 30 are also provided in the tread, due to the additional edge effect by the sipes 30, the travel performance of the pneumatic tire on the frozen road surface is further improved. In the case where each of the recesses 32 is formed between the two sipes 30 and where the recesses 32 and the sipes 30 do not overlap or contact each other, each of the recesses 32 exhibits the additional edge effect without diminishing the edge effect exhibited by the sipes 30.

Here, when W2/W1 and W3/W1 are equal to or greater than 0.1 and equal to or less than 0.3 as described above, the edge effects by the sipes 30 and the recesses 32 are improved, which further improves the travel performance on the frozen road surface. More specifically, since W2/W1 and W3/W1 are equal to or greater than 0.1, a rubber portion between the sipe 30 and the recess 32 has sufficient thickness, and such a portion can exert the large elastic force. Thus, the edge effect is improved, and the travel performance on the frozen road surface is further improved. In addition, since W2/W1 and W3/W1 are equal to or less than 0.3, the rubber portion between the sipe 30 and the recess 32 is not excessively thickened and is deformable, and such a portion can exert the large elastic force. Thus, the edge effect is improved, and the travel performance on the frozen road surface is further improved.

In the pneumatic tire according to this embodiment, in the case where the ratio of the total opening area of all of the recesses 32 provided in the single land section piece 36 to the ground contact area of the single land section piece 36 is equal to or greater than 10% and equal to or less than 40%, the edge effect exhibited by the recesses 32 is further improved. Thus, the travel performance on the frozen road surface is further improved. More specifically, since the above ratio is equal to or greater than 10%, the rubber portion between the sipe 30 and the recess 32 has the thickness that allows the deformation, and a circumference of the opening end 34 is increased due to enlargement of the opening end 34 of the recess 32. Thus, the edge effect exhibited by the recesses 32 is further improved, and the travel performance on the frozen road surface is further improved. In addition, since the above ratio is equal to or less than 40%, rigidity of the land section piece 36 is secured. Thus, the edge effect by the recesses 32 is further improved, and the travel performance on the frozen road surface is further improved.

Figure 9A:
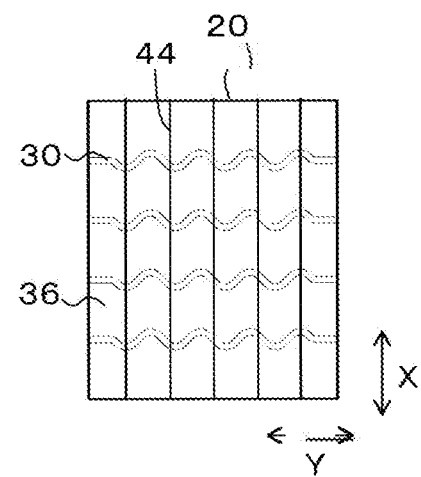
FIG. 9A is a view of one of blocks in a pneumatic tire according to a first comparative example that is seen from the outer side in the tire radial direction.

In order to confirm the effects of the embodiment described so far, steering stability performance of pneumatic tires on an icy road surface in an example and comparative examples illustrated in Table 1, FIG. 2, and FIGS. 9A, B were evaluated. The pneumatic tire in the example is the same as the pneumatic tire according to the above embodiment illustrated in FIG. 2. The pneumatic tire in a first comparative example illustrated in FIG. 9A differs from the pneumatic tire according to the above embodiment in a point that the recess 32 is not provided in all blocks. The pneumatic tire in a second comparative example illustrated in FIG. 9B differs from the pneumatic tire according to the above embodiment in a point that the recess 32 overlaps the edge 44 of the shallow groove 40.

The steering stability performance on the icy road surface was evaluated as follows. First, a driver got on one of vehicles, to which the pneumatic tires in the examples are attached, and drove the vehicle for acceleration, braking, turning, and a lane change on the icy road surface. Then, the driver made sensory evaluation of the steering stability performance. A result of the evaluation in the first comparative example was set to 100, and then the evaluation was made by using an index which indicated that the steering stability performance was superior as the index was increased.

The evaluation results were as illustrated in Table 1. It was confirmed that the pneumatic tires in the example had the superior steering stability performance on the icy road surface to the pneumatic tires in the first comparative example and the second comparative example.

TABLE 1

Figure 9B:
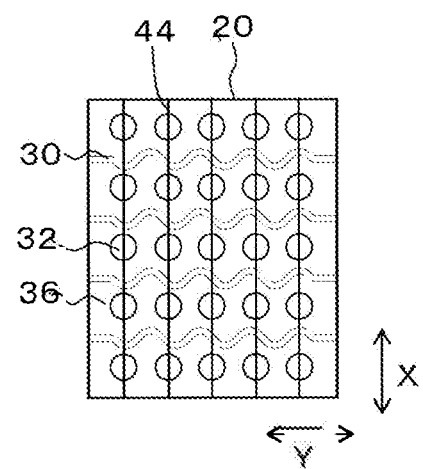
FIG. 9B is a view of one of blocks in a pneumatic tire according to a second comparative example that is seen from the outer side in the tire radial direction.

|  | First Comparative Example | Second Comparative Example | Example |
|---|---|---|---|
| Drawing of Block | FIG. 9A | FIG. 9B | FIG. 2 |
| Presence/absence of Shallow Grooves | Present | Present | Present |
| Presence/absence of Recesses | Absent | Present | Present |
| Position of Each of Recesses | — | Position of Edge | Between Two Edges |
| Steering Stability Performance on Icy Road Surface | 100 | 102 | 104 |

The embodiment that has been described so far is merely illustrative, and the scope of the invention is not limited thereto. Various types of elimination, replacement, and modifications can be made to the embodiment that has been described so far within the scope that does not depart from the gist of the invention. The embodiment that has been described so far and the modifications thereof are included in the invention described in the claims and equivalence thereof.

The invention claimed is:

1. A pneumatic tire which is formed with plural shallow grooves and plural recesses in a tread and in which the plural shallow grooves extend in parallel, wherein
the plural shallow grooves are deeper than the plural recesses,
the plural shallow grooves form a saw teeth shape as a cross-sectional shape of the tread in a direction orthogonal to an extending direction of the plural shallow grooves, and portions corresponding to apexes of the saw teeth shape are formed as edges,
the plural shallow grooves extend in a tire circumferential direction,
each of the plural recesses is formed between each adjacent pair of the edges, and
in the case where a distance between the edges on both sides of each of the plural recesses is set as V1, a distance between each of the plural recesses and one of the edges is set as V2, and a distance between each of the plural recesses and the other edge is set as V3, V2/V1 and V3/V1 are equal to or greater than 0.1 and equal to or less than 0.3.

2. The pneumatic tire according to claim 1, wherein
plural sipes are formed in the tread, and each of the plural recesses is formed in a land section piece sandwiched between each adjacent pair of the plural sipes, and
in the case where a distance between the adjacent pair of the plural sipes on both sides of each of the plural recesses is set as W1, a distance between each of the plural recesses and one of the adjacent pair of the plural sipes is set as W2, and a distance between each of the plural recesses and the other one of the adjacent pair of the plural sipes is set as W3, W2/W1 and W3/W1 are equal to or greater than 0.1 and equal to or less than 0.3.

3. The pneumatic tire according to claim 1, wherein
plural sipes are formed in the tread, and each of the plural recesses is formed in a land section piece sandwiched between each adjacent pair of the plural sipes, and
a ratio of a total opening area of all of the plural recesses provided in the land section piece that is a portion sandwiched between each of the adjacent pair of the plural sipes to a ground contact area of the land section piece is equal to or greater than 10% and equal to or less than 40%.

* * * * *